(12) United States Patent
Deng et al.

(10) Patent No.: US 11,226,709 B2
(45) Date of Patent: Jan. 18, 2022

(54) TOUCH SUBSTRATE AND TOUCH SCREEN

(71) Applicant: WUHAN CHINA STAR OPTOELECTRONICS SEMICONDUCTOR DISPLAY TECHNOLOGY CO., LTD., Wuhan (CN)

(72) Inventors: Yichao Deng, Wuhan (CN); Jian Ye, Wuhan (CN)

(*) Notice: Subject to any disclaimer, the term of this patent is extended or adjusted under 35 U.S.C. 154(b) by 0 days.

(21) Appl. No.: 16/965,628

(22) PCT Filed: Mar. 13, 2020

(86) PCT No.: PCT/CN2020/079112
§ 371 (c)(1),
(2) Date: Jul. 29, 2020

(87) PCT Pub. No.: WO2021/109353
PCT Pub. Date: Jun. 10, 2021

(65) Prior Publication Data
US 2021/0173524 A1   Jun. 10, 2021

(51) Int. Cl.
*G06F 3/044* (2006.01)
(52) U.S. Cl.
CPC .......... *G06F 3/0446* (2019.05); *G06F 3/0443* (2019.05); *G06F 2203/04101* (2013.01); *G06F 2203/04111* (2013.01); *G06F 2203/04112* (2013.01)
(58) Field of Classification Search
CPC ................ G06F 3/0446; G06F 3/0443; G06F 2203/04101; G06F 2203/04112; G06F 2203/04111
See application file for complete search history.

(56) References Cited

U.S. PATENT DOCUMENTS

| | | | | |
|---|---|---|---|---|
| 2005/0230827 | A1* | 10/2005 | Naito | H01L 24/13 257/737 |
| 2010/0134422 | A1* | 6/2010 | Borras | G06F 3/0446 345/173 |
| 2011/0227858 | A1* | 9/2011 | An | G06F 3/0446 345/174 |
| 2012/0146943 | A1* | 6/2012 | Fairley | G06F 3/0445 345/174 |
| 2012/0299868 | A1* | 11/2012 | Bhagavat | G06F 3/0445 345/174 |
| 2013/0050130 | A1* | 2/2013 | Brown | G06F 3/0446 345/174 |
| 2013/0207924 | A1* | 8/2013 | Mohindra | G06F 3/0446 345/174 |
| 2014/0098304 | A1* | 4/2014 | Kim | G06F 3/0446 349/12 |

(Continued)

FOREIGN PATENT DOCUMENTS

| CN | 103594483 A | 2/2014 |
|---|---|---|
| CN | 106201109 A | 12/2016 |
| CN | 109885203 A | 6/2019 |

*Primary Examiner* — Amy Onyekaba (57) ABSTRACT

A touch substrate for a touch screen includes a touch layer. The touch layer includes a first electrode and a second electrode. The first electrode includes a first protrusion and a first dummy electrode. The second electrode includes a second protrusion and a second dummy electrode. Adjacent two first protrusions or adjacent two second protrusions are spaced apart by a size of at least one sub-pixel.

18 Claims, 5 Drawing Sheets

(56) References Cited

U.S. PATENT DOCUMENTS

| | | | |
|---|---|---|---|
| 2014/0160374 A1* | 6/2014 | Wang | G06F 3/0443 349/12 |
| 2015/0011030 A1 | 1/2015 | Choi et al. | |
| 2015/0054782 A1* | 2/2015 | Liu | G06F 3/0448 345/174 |
| 2015/0075959 A1* | 3/2015 | Lu | G06F 3/04166 200/5 R |
| 2015/0220181 A1* | 8/2015 | Jung | G06F 3/0443 345/174 |
| 2015/0370363 A1* | 12/2015 | Trend | G06F 3/0443 345/174 |
| 2015/0370369 A1* | 12/2015 | Kuo | G06F 3/03547 345/174 |
| 2015/0372208 A1* | 12/2015 | Chae | H01L 33/38 257/98 |
| 2015/0378473 A1* | 12/2015 | Hu | G06F 3/0445 345/174 |
| 2016/0117002 A1* | 4/2016 | Lee | G06F 3/0445 345/173 |
| 2016/0246393 A1* | 8/2016 | Lee | G06F 3/041 |
| 2016/0378256 A1* | 12/2016 | Lee | G06F 3/0412 345/174 |
| 2017/0024060 A1* | 1/2017 | Seong | G06F 3/0445 |
| 2017/0068386 A1* | 3/2017 | Lai | G06F 3/0446 |
| 2017/0090622 A1* | 3/2017 | Badaye | G06F 3/0446 |
| 2017/0153762 A1* | 6/2017 | Kim | G06F 3/0445 |
| 2017/0372115 A1* | 12/2017 | Lee | G06K 9/0002 |
| 2018/0292927 A1* | 10/2018 | Chu | G06F 3/041 |
| 2019/0004638 A1* | 1/2019 | Lee | G06F 3/0443 |
| 2019/0114006 A1* | 4/2019 | Sakaue | G06F 3/0445 |
| 2019/0121474 A1* | 4/2019 | Lee | G06F 3/0443 |
| 2019/0258338 A1* | 8/2019 | Park | G06F 3/044 |
| 2019/0302935 A1* | 10/2019 | Clark | H01L 27/3276 |
| 2019/0302936 A1* | 10/2019 | Clark | G06F 3/0443 |
| 2019/0302959 A1* | 10/2019 | Clark | G06F 3/0412 |
| 2020/0089369 A1* | 3/2020 | Bang | G06F 3/0448 |
| 2020/0133438 A1* | 4/2020 | Kim | G06F 3/0448 |
| 2020/0301546 A1* | 9/2020 | Ye | G06F 3/0448 |
| 2021/0034185 A1* | 2/2021 | Kim | H01L 27/323 |
| 2021/0083036 A1* | 3/2021 | Kang | H01L 27/3276 |
| 2021/0165531 A1* | 6/2021 | Kim | G06F 3/0412 |

* cited by examiner

TOUCH SUBSTRATE AND TOUCH SCREEN

FIELD OF APPLICATION

The present application is related to the display field, and specifically, to a touch substrate and a touch screen.

BACKGROUND OF APPLICATION

With development of display technology, touch screens are more and more commonly used in electronic devices such as tablets and smartphones. Capacitive touch screens in the prior art are most widely used in smartphones, tablets, etc. Traditional capacitive screens use an indium tin oxide (ITO) conductive film as material of touch electrodes. These kinds of capacitive screens have disadvantages of high price, high resistance, and difficulty in bending. Development of metal mesh technology has made up for defects of the above ITO touch electrodes.

Currently, hovering touch is a new type of touch technology which allows users to complete mobile phone operations without touching a touch screen (i.e., the touch screen is not grounded) when using the mobile phone. However, under a premise of good physical touch of the touch screen in the prior art, sensitivity of the hovering touch is low, which affects user experience.

Therefore, a touch substrate which can solve the above technical problems is urgently needed.

SUMMARY OF APPLICATION

The present application provides a touch substrate and a touch screen to solve a technical problem of low sensitivity of hovering touch of touch screens in the prior art.

The present application provides a touch substrate, including a substrate and a touch layer formed on the substrate. The touch layer includes:

at least one first electrode group arranged along a first direction including at least two first electrodes arranged along a second direction and sequentially connected to each other, wherein a respective first electrode of the at least two first electrodes includes at least one first connection region outside the respective first electrode of the at least two first electrodes, and the at least one first connection region includes at least one first protrusion; and at least one second electrode group arranged along the second direction including at least two second electrodes arranged along the first direction and sequentially connected to each other, wherein a respective second electrode of the at least two second electrodes includes at least one second connection region outside the respective second electrode of the at least two second electrodes, and the at least one second connection region includes at least one second protrusion.

The at least one first protrusion is disposed between two adjacent second protrusions. The at least one second protrusion is disposed between two adjacent first protrusions. The at least one first connection region and the at least one second connection region are engaged with each other to form a connection portion of the respective first electrode and the respective second electrode.

At least one first dummy electrode disposed in the respective first electrode of the at least two first electrodes. The at least one first dummy electrode is uniformly distributed in the respective first electrode. The at least one first dummy electrode is insulated from the respective first electrode.

At least one second dummy electrode disposed in the respective second electrode of the at least two second electrodes. The at least one second dummy electrode is uniformly distributed in the respective second electrode. The at least one second dummy electrode is insulated from the respective second electrode.

Adjacent two first protrusions or adjacent two second protrusions are spaced apart by a size of at least one sub-pixel. The at least one first dummy electrode and the at least one second protrusion are spaced apart by the size of the at least one sub-pixel. The at least one second dummy electrode and the at least one first protrusion are spaced apart by the size of the at least one sub-pixel.

In the touch substrate of the present application, a number of the at least one first dummy electrode in the respective first electrode of the at least two first electrodes is equal to a number of the at least one second dummy electrode in the respective second electrode of the at least two second electrodes.

A shape of the at least one first dummy electrode in the respective first electrode of the at least two first electrodes is same as a shape of the at least one second dummy electrode in the respective second electrode of the at least two second electrodes.

In the touch substrate of the present application, a pattern of the at least one first connection region is same as a pattern of the at least one second connection region.

In the touch substrate of the present application, the at least one first protrusion and the at least one second protrusion are cross-shaped.

In the touch substrate of the present application, the at least one first protrusion in the at least one first connection region and the at least one second protrusion in the at least one second connection region have a same extension length.

The at least one first protrusion extends from the respective first electrode to the at least one second dummy electrode in the respective second electrode. The at least one second protrusion extends from the respective second electrode to the at least one first dummy electrode in the respective first electrode.

In the touch substrate of the present application, the at least one first protrusion in the at least one first connection region and the at least one second protrusion in the at least one second connection region have different extension lengths.

An extension length of at least one the first protrusion and/or the at least one second protrusion are increased first and then decreased in the at least one first connection region and/or the at least one second connection region.

In the touch substrate of the present application, the respective first electrode, the at least one first dummy electrode, the respective second electrode, and the at least one second dummy electrode are composed of metal meshes.

In the touch substrate of the present application, the respective first electrode is insulated from and crossed with the respective second electrode on the touch layer through a breakpoint of the metal meshes. The at least one first dummy electrode is insulated from the respective first electrode through a breakpoint of the metal meshes. The at least one second dummy electrode is insulated from the respective second electrode through a breakpoint of the metal meshes.

In the touch substrate of the present application, the metal meshes include a plurality of first metal traces and a plurality of second metal traces.

The plurality of first metal traces are crossed with the plurality of second metal traces to form a plurality of meshes having a same shape as an outer circle of a corresponding one of the at least one sub-pixel.

In the touch substrate of the present application, the at least one first electrode group further includes at least one first metal bridge disposed between two adjacent first electrodes. The at least one second electrode group further includes at least one second metal bridge disposed between two adjacent second electrodes.

The at least one first metal bridge, the respective first electrode, and the respective second electrode are a same metal layer.

The at least one first metal bridge and the at least one second metal bridge are different metal layers.

The present application further provides a touch screen, including a touch substrate.

The touch substrate includes a substrate and a touch layer formed on the substrate. The touch layer includes:

at least one first electrode group arranged along a first direction including at least two first electrodes arranged along a second direction and sequentially connected to each other, wherein a respective first electrode of the at least two first electrodes includes at least one first connection region outside the respective first electrode of the at least two first electrodes, and the at least one first connection region includes at least one first protrusion; and at least one second electrode group arranged along the second direction including at least two second electrodes arranged along the first direction and sequentially connected to each other, wherein a respective second electrode of the at least two second electrodes includes at least one second connection region outside the respective second electrode of the at least two second electrodes, and the at least one second connection region includes at least one second protrusion.

The at least one first protrusion is disposed between two adjacent second protrusions. The at least one second protrusion is disposed between two adjacent first protrusions. The at least one first connection region and the at least one second connection region are engaged with each other to form a connection portion of the respective first electrode and the respective second electrode.

At least one first dummy electrode disposed in the respective first electrode of the at least two first electrodes. The at least one first dummy electrode is uniformly distributed in the respective first electrode. The at least one first dummy electrode is insulated from the respective first electrode.

At least one second dummy electrode disposed in the respective second electrode of the at least two second electrodes. The at least one second dummy electrode is uniformly distributed in the respective second electrode. The at least one second dummy electrode is insulated from the respective second electrode.

Adjacent two first protrusions or adjacent two second protrusions are spaced apart by a size of at least one sub-pixel. The at least one first dummy electrode and the at least one second protrusion are spaced apart by the size of the at least one sub-pixel. The at least one second dummy electrode and the at least one first protrusion are spaced apart by the size of the at least one sub-pixel.

In the touch screen of the present application, a number of the at least one first dummy electrode in the respective first electrode of the at least two first electrodes is equal to a number of the at least one second dummy electrode in the respective second electrode of the at least two second electrodes.

A shape of the at least one first dummy electrode in the respective first electrode of the at least two first electrodes is same as a shape of the at least one second dummy electrode in the respective second electrode of the at least two second electrodes.

In the touch screen of the present application, a pattern of the at least one first connection region is same as a pattern of the at least one second connection region.

In the touch screen of the present application, the at least one first protrusion and the at least one second protrusion are cross-shaped.

In the touch screen of the present application, the at least one first protrusion in the at least one first connection region and the at least one second protrusion in the at least one second connection region have a same extension length.

The at least one first protrusion extends from the respective first electrode to the at least one second dummy electrode in the respective second electrode. The at least one second dummy electrode and the at least one first protrusion are spaced apart by the size of the at least one sub-pixel.

The at least one second protrusion extends from the respective second electrode to the at least one first dummy electrode in the respective first electrode. The at least one first dummy electrode and the at least one second protrusion are spaced apart by the size of the at least one sub-pixel.

In the touch screen of the present application, the at least one first protrusion in the at least one first connection region and the at least one second protrusion in the at least one second connection region have different extension lengths.

An extension length of the at least one first protrusion and/or the at least one second protrusion are increased first and then decreased in the at least one first connection region and/or the at least one second connection region.

In the touch screen of the present application, the respective first electrode, the at least one first dummy electrode, the respective second electrode, and the at least one second dummy electrode are composed of metal meshes.

The respective first electrode is insulated from and crossed with the respective second electrode on the touch layer through a breakpoint of the metal meshes. The at least one first dummy electrode is insulated from the respective first electrode through a breakpoint of the metal meshes. The at least one second dummy electrode is insulated from the respective second electrode through a breakpoint of the metal meshes.

In the touch screen of the present application, the metal meshes include a plurality of first metal traces and a plurality of second metal traces.

The plurality of first metal traces are crossed with the plurality of second metal traces to form a plurality of meshes having a same shape as an outer circle of a corresponding one of the at least one sub-pixel.

In the touch screen of the present application, the at least one first electrode group further includes at least one first metal bridge disposed between two adjacent first electrodes. The at least one second electrode group further includes at least one second metal bridge disposed between two adjacent second electrodes.

The at least one first metal bridge, the respective first electrode, and the respective second electrode are a same metal layer.

The at least one first metal bridge and the at least one second metal bridge are different metal layers.

The present application increases a mutual capacitance between the at least two first electrodes and the at least two second electrodes by increasing a proportion of a corresponding electrode occupied by the dummy electrodes and a relative length between the respective first electrode and the respective second electrode. This increases multi-finger coaxial capacitance variation of a product under the hovering touch and enhances touch sensitivity of the touch substrate.

DETAILED DESCRIPTION OF PREFERRED EMBODIMENTS

In order to make purposes, technical solutions, and effects of the present application clearer and more explicit, the present application is further described in detail below with reference to accompanying drawings and embodiments of the present application. It should be understood that specific embodiments described herein are only used to explain the present application and are not used to limited the present application.

Currently, hovering touch is a new type of touch technology which allows users to complete mobile phone operations without touching a touch screen. However, under a premise of good physical touch of a touch screen in the prior art, sensitivity of the hovering touch is low, which affects user experience. The present application provides the following technical solutions based on the above technical problems.

The present provides a touch substrate, including a substrate 40 and a touch layer 100 formed on the substrate 40.

Figure 1:
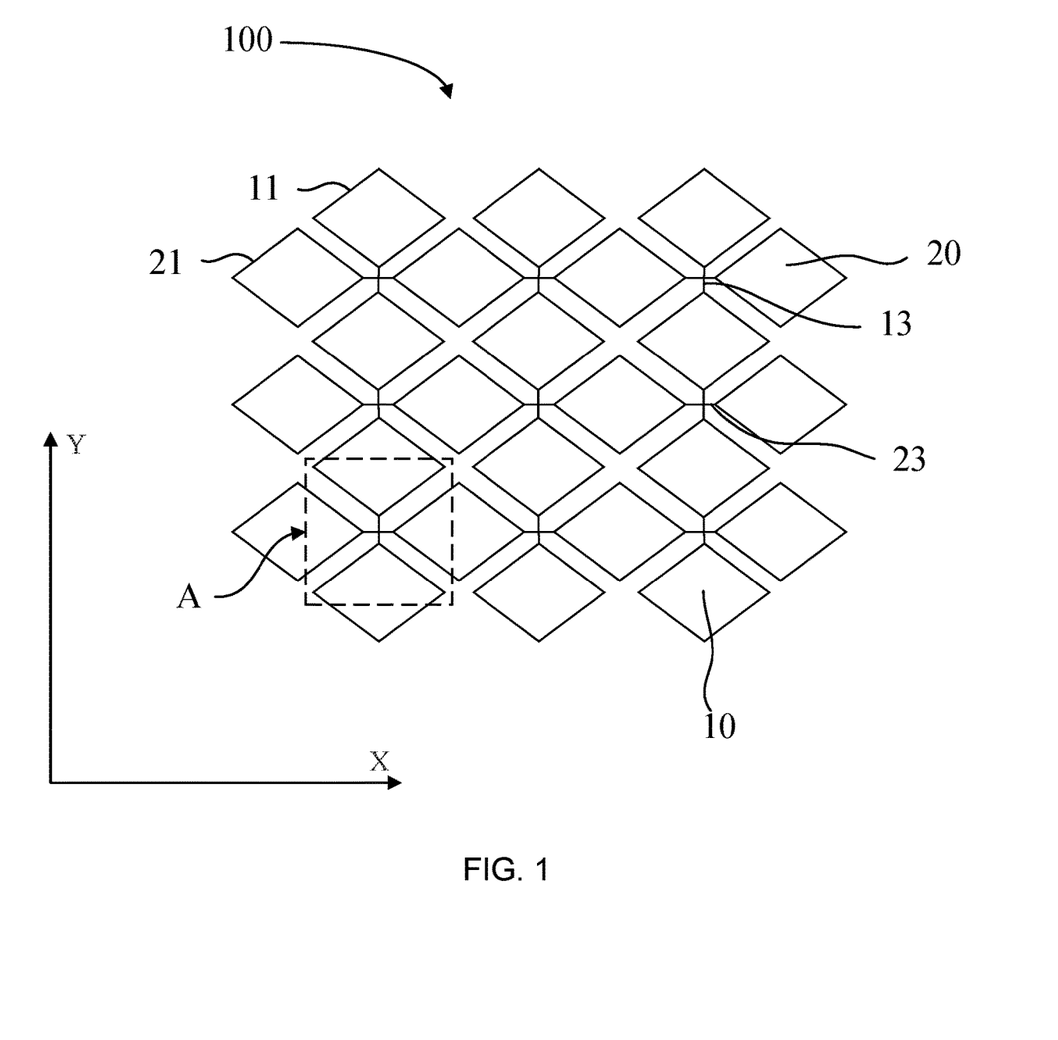
FIG. 1 is a structural diagram of a touch layer in a touch substrate of the present application.
Figure 2:
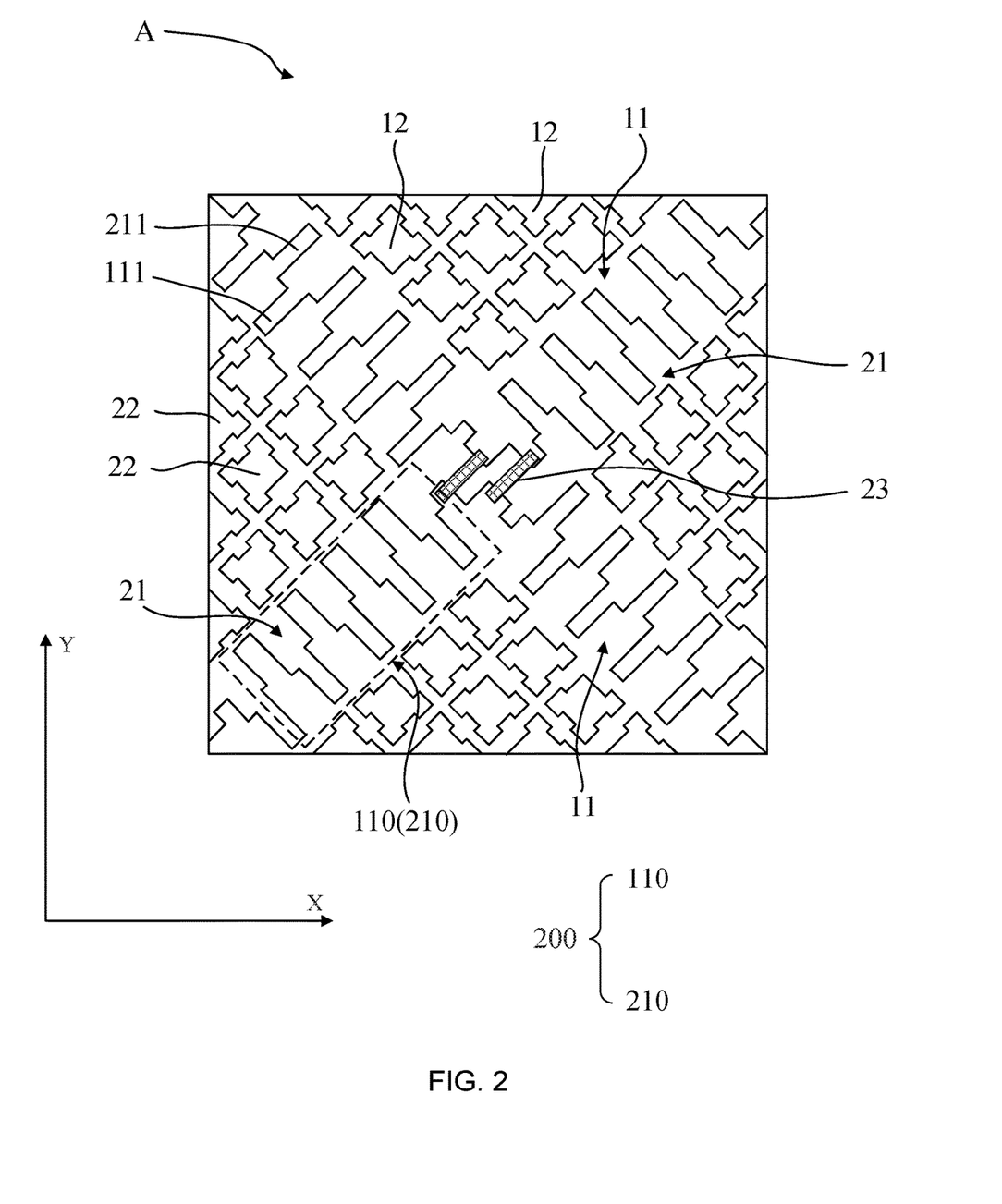
FIG. 2 is a first enlarged structural diagram of a region A in FIG. 1.

Please refer to FIGS. 1 and 2. The touch layer includes:

at least one first electrode group 10 arranged along a first direction X including at least two first electrodes 11 arranged along a second direction Y and sequentially connected to each other, wherein a respective first electrode 11 of the at least two first electrodes 11 includes at least one first connection region 110 outside the respective first electrode 11 of the at least two first electrodes 11, and the at least one first connection region 110 includes at least one first protrusion 111; and at least one second electrode group 20 arranged along the second direction Y including at least two second electrodes 21 arranged along the first direction X and sequentially connected to each other, wherein a respective second electrode 21 of the at least two second electrodes 21 includes at least one second connection region 210 outside the respective second electrode 21 of the at least two second electrodes 21, and the at least one second connection region 210 includes at least one second protrusion 211.

In this embodiment, the at least one first protrusion 111 is disposed between two adjacent second protrusions 211. The at least one second protrusion 211 is disposed between two adjacent first protrusions 111.

In this embodiment, the at least one first connection region 110 and the at least one second connection region 210 are engaged with each other to form a connection portion 200 of the respective first electrode 11 and the respective second electrode 21.

In this embodiment, the first direction is the X direction which is parallel to a horizontal direction. The second direction is the Y direction which is parallel to a vertical direction.

In this embodiment, the touch layer 100 further includes at least one first dummy electrode 12 disposed in the respective first electrode 11 of the at least two first electrodes 11. The at least one first dummy electrode 12 is uniformly distributed in the respective first electrode 11. The at least one first dummy electrode 12 is insulated from the respective first electrode 11.

In this embodiment, the touch layer 100 further includes at least one second dummy electrode 22 disposed in the respective second electrode 21 of the at least two second electrodes 21. The at least one second dummy electrode 22 is uniformly distributed in the respective second electrode 21. The at least one second dummy electrode 22 is insulated from the respective second electrode 21.

In this embodiment, adjacent two first protrusions 111 or adjacent two second protrusions 211 are spaced apart by a size of at least one sub-pixel. The at least one second dummy electrode 22 and the at least one first protrusion 111 are spaced apart by the size of the at least one sub-pixel. The at least one first dummy electrode 12 and the at least one second protrusion 211 are spaced apart by the size of the at least one sub-pixel.

The present application reduces a distance between two adjacent first protrusions 111 or two adjacent second protrusions 211, or increases a length of the at least one first protrusion 111 or the at least one second protrusion 211. A mutual capacitance between the respective first electrode 11 and the respective second electrode 21 is increased, and a proportion of a corresponding electrode occupied by the at least one first dummy electrode 12 and the at least one second dummy electrode 22 is increased, so multi-finger coaxial capacitance variation of a product under the hovering touch and enhances touch sensitivity of the touch substrate.

In this embodiment, a number of the at least one first dummy electrode 12 in the respective first electrode 11 of the at least two first electrodes 11 is equal to a number of the at least one second dummy electrode 22 in the respective second electrode 21 of the at least two second electrodes 21.

In this embodiment, a shape of the at least one first dummy electrode 12 in the respective first electrode 11 of the at least two first electrodes 11 is same as a shape of the at least one second dummy electrode 22 in the respective second electrode 21 of the at least two second electrodes 21. Shapes of the at least one first dummy electrode 12 and the at least one second dummy electrode 22 are not limited in the present application, which can be configured according to a specific embodiment.

In this embodiment, the respective first electrode 11, the at least one first dummy electrode 12, the respective second electrode 21, and the at least one second dummy electrode 22 are composed of metal meshes 30.

Figure 3:
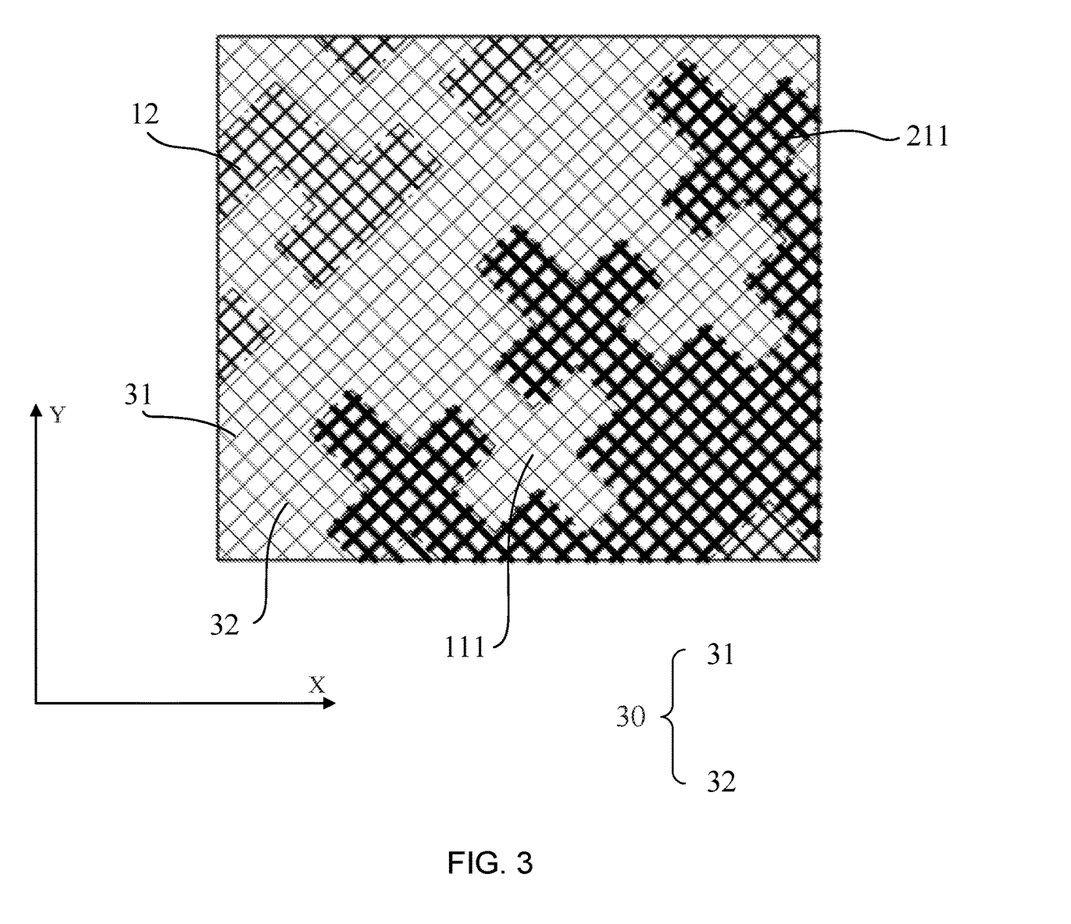
FIG. 3 is an enlarged structural diagram of a certain region in FIG. 1.

Please refer to FIG. 3. the respective first electrode 11 is insulated from and crossed with the respective second electrode 21 on the touch layer 100 through a breakpoint of the metal meshes 30. The at least one first dummy electrode 12 is insulated from the respective first electrode 11 through a breakpoint of the metal meshes 30. The at least one second dummy electrode 22 is insulated from the respective second electrode 21 through a breakpoint of the metal meshes 30.

In this embodiment, the at least one first protrusion 111 and the at least one second protrusion 211 can be cross-shaped.

Taking a certain region in FIG. 1 as an example for description, the metal meshes 30 include a plurality of first metal traces 31 and a plurality of second metal traces 32. The plurality of first metal traces 31 are crossed with the plurality of second metal traces 32 to form a plurality of meshes having a same shape as an outer circle of a corresponding one of the at least one sub-pixel. For ease of description, the metal meshes in FIG. 3 of the present application are rhombus meshes same as the prior art.

Figure 4:
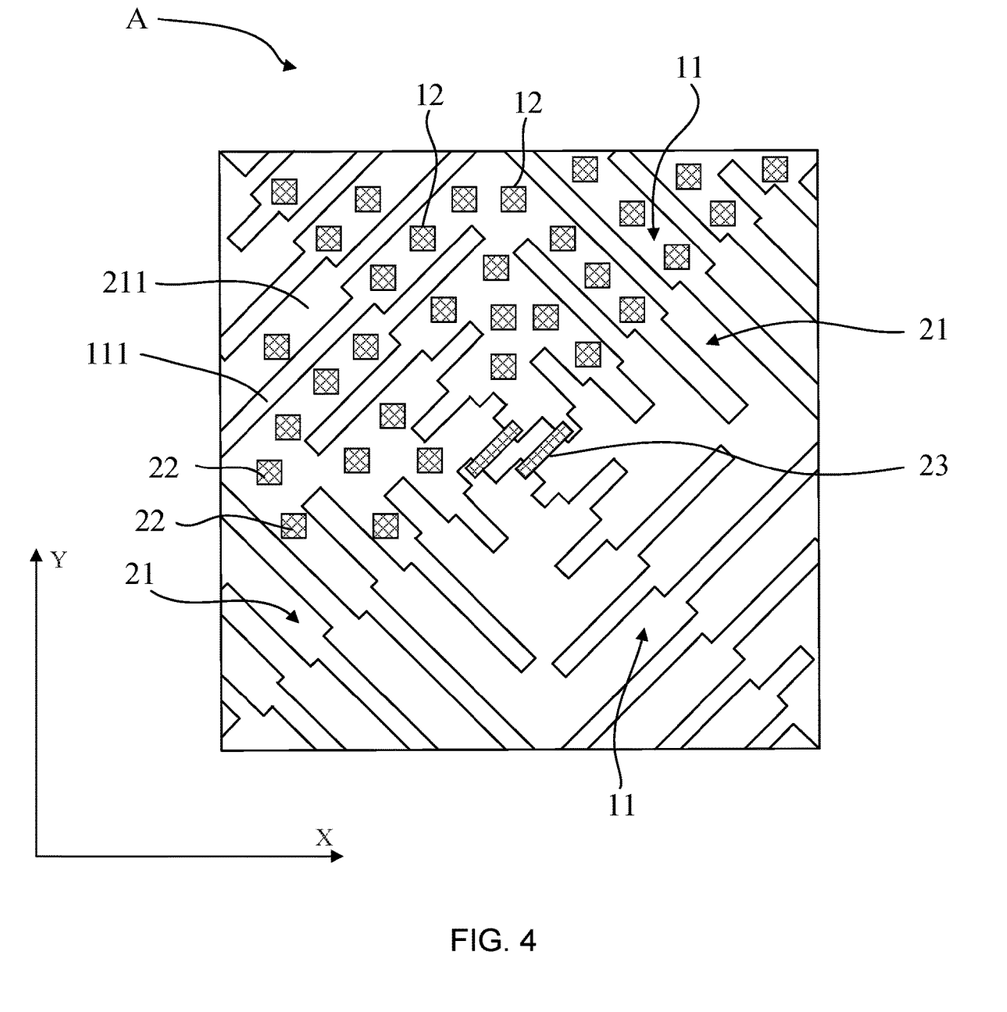
FIG. 4 is a second enlarged structural diagram of the region A in FIG. 1.

Please refer to FIGS. 2 and 4. A pattern of the at least one first connection region 110 is same as a pattern of the at least one second connection region 210.

Please refer to FIG. 2. The at least one first protrusion 111 in the at least one first connection region 110 and the at least one second protrusion 211 in the at least one second connection region 210 have a same extension length.

The at least one first protrusion 111 extends from the respective first electrode 11 to the at least one second dummy electrode 22 in the respective second electrode 21. The at least one second protrusion 211 extends from the respective second electrode 21 to the at least one first dummy electrode 12 in the respective first electrode 11.

Please refer to FIG. 4. The at least one first protrusion 111 in the at least one first connection region 110 and the at least one second protrusion 211 in the at least one second connection region 210 have different extension lengths.

An extension length of the at least one first protrusion 111 and/or the at least one second protrusion 211 are increased first and then decreased in the at least one first connection region 110 and/or the at least one second connection region 210.

Please refer to FIGS. 1 to 5. The at least one first electrode group 10 further includes at least one first metal bridge 13 disposed between two adjacent first electrodes 11. The at least one second electrode group 20 further includes at least one second metal bridge 23 disposed between two adjacent second electrodes 21.

In this embodiment, the at least one first metal bridge 13, the respective first electrode 11, and the respective second electrode 21 are a same metal layer. The at least one first metal bridge 13 and the at least one second metal bridge 23 are different metal layers.

Figure 5:
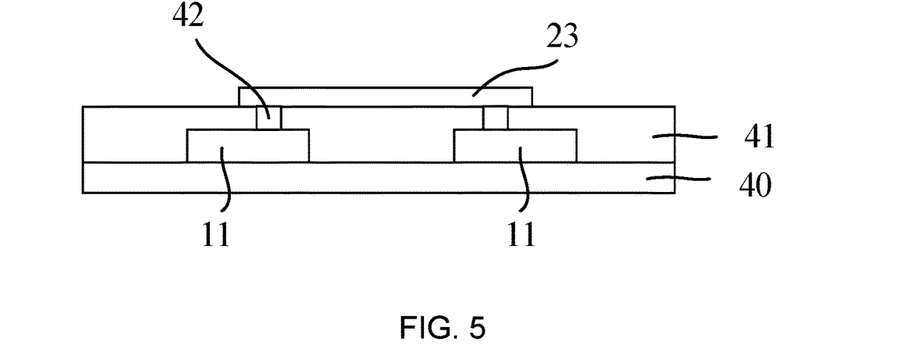
FIG. 5 is a cross-sectional diagram of a partial region of the touch substrate of the present application.

Please refer to FIG. 5. At least one insulating layer 41 disposed between the at least one second metal bridge 23 and the respective first electrode 11. At least two first through holes 42 are disposed on the at least one insulating layer 41. The at least one second metal bridge 23 electrically connects adjacent two first electrodes 11 through a respective first through hole 42 of the at least two first through holes 42.

In this embodiment, the at least one second metal bridge 23 is disposed between the substrate 40 and the touch layer 100, or the at least one second metal bridge 23 is disposed on the touch layer 100.

The technical solutions of the present application are described in the following specific embodiments.

Please refer to FIG. 1. The touch layer 100 includes three columns of the first electrode groups 10 parallelly arranged along the X direction and three rows of the second electrode groups 20 parallelly arranged along the Y direction. The respective first electrode group 10 of the first electrode groups 10 includes four first electrodes 11 arranged along the Y direction and electrically connected to each other. The respective second electrode group 20 of the second electrode groups 20 includes four second electrodes 21 arranged along the X direction and electrically connected to each other. The respective first electrode 11 is insulated from and crossed with the respective second electrode 21.

Please refer to FIG. 2. In a region A, the plurality of first dummy electrodes 12 are disposed in the respective first electrode 11 of the at least two first electrodes 11, and the plurality of second dummy electrodes 22 are disposed in the respective second electrode 21 of the at least two second electrodes 21. In this embodiment, four by four dummy electrodes are disposed in the respective first electrode 11 of the respective second electrode 21. The shape of the dummy electrodes is the same.

In this embodiment, because an area of the respective first electrode 11 of the at least two first electrodes 11 and an area of the respective second electrode 21 of the at least two second electrodes 21 can be substantially the same, in the respective first electrode 11 or the respective second electrode 21, their proportions of an area of a corresponding electrode occupied by the dummy electrodes are equal.

In the prior art, arrangements of the dummy electrodes are mainly used to remove a technical problem of an unexpected visible streak effect. The present application is mainly used to reduce a proportion of an area occupied by the respective first electrode 11 and the respective second electrode 21, so a side capacitance between the respective first electrode 11 and the respective second electrode 21 is reduced, and the sensitivity of the touch substrate in the hovering touch state is increased.

Please refer to FIG. 2. the at least one first connection region 110 coincides with the at least one second connection region 210. the at least one first connection region 110 includes five first protrusions 111. the at least one second connection region 210 includes five second protrusions 211. The at least one first protrusion 111 and the second protrusion are engaged with each other to form a complete pattern.

Please refer to FIG. 3. Although the respective first electrode 11, the at least one first dummy electrode 12, the respective second electrode 21, and the at least one second dummy electrode 22 are visually shown as one piece, the respective first electrode 11 and the at least one first dummy electrode 12 are insulated from the respective second electrode 21 and the at least one second dummy electrode 22 through breakpoints of metal traces on boundary regions of the four. Therefore, the at least one first protrusion 111 and the at least one second protrusion 211 are insulated from each other through breakpoints of metal traces between the at least one first protrusion 111 and the at least one second protrusion 211 in FIG. 2.

Compared with the prior art, this embodiment does not need to dispose a dummy electrode between the respective first electrode 11 and the respective second electrode 21 to remove technical problems such as visual hollowing out.

In addition, in the prior art, the first metal traces 31 are crossed with the second metal traces 32 to form rhombus meshes, which correspond to data lines and scan lines. In the present application, the plurality of first metal traces 31 are crossed with the plurality of second metal traces 32 to form the plurality of meshes having the same shape as the outer circle of the corresponding sub-pixel, so the metal meshes 30 are closer to a structure of an actual product.

Please refer to FIGS. 2 and 4. In order to ensure the sensitivity of touch operation in each region, the pattern of the at least one first connection region 110 is same as the pattern of the at least one second connection region 210, which means that a pattern of the respective first electrode 11 is same as a pattern of the respective second electrode 21. This ensures that relative lengths between the first electrode and the second electrode in any regions are the same. In this embodiment, an area between the respective first electrode 11 and the respective second electrode 21 directly opposite to the respective first electrode 11 is related to the relative length between the respective first electrode 11 and the respective second electrode 21.

Please refer to FIG. 2. The at least one first protrusion 111 and the at least one second protrusion 211 have the same extension length and shape. The at least one first protrusion 111 can extend to the at least one second dummy electrode 22 as much as possible, and the at least one second protrusion 211 can extend to the at least one first dummy electrode 12 as much as possible, so the relative length between the respective first electrode 11 and the second electrode is increased, but the area occupied by the respective first electrode 11 and the respective second electrode 21 is reduced.

In this embodiment, the at least one second dummy electrode 22 and the at least one first protrusion 111 are spaced apart by a size of one sub-pixel, and the at least one first dummy electrode 12 and the at least one second protrusion 211 are spaced apart by the size of one sub-pixel. The relative length between the at least one first protrusion 111 and the at least one second protrusion 211 is the largest, so the area between the respective first electrode 11 and the respective second electrode 21 directly opposite to the respective first electrode 11 is the largest, which increases the mutual capacitance between the respective first electrode 11 and the respective second electrode 21, increases the capacitance variation of the product under the hovering touch, and enhances the touch sensitivity of the touch substrate.

Please refer FIG. 4. the at least one first protrusion 111 in the at least one first connection region 110 and the at least one second protrusion 211 in the at least one second connection region 210 have different extension lengths. The extension length of the at least one first protrusion 111 and/or the at least one second protrusion 211 are increased first and then decreased in the at least one first connection region 110 and/or the at least one second connection region 210.

In this embodiment, the extension length of the protrusions in a middle region of the at least one first connection region 110 or the at least one second connection region 210 has the largest extension length, and is close to a center of a corresponding electrode. In order to avoid a conflict between extensions of two first protrusions 111, in a direction from the above protrusions to two opposite sides, the extension length of the corresponding protrusion is gradually reduced.

In this embodiment, the at least one first dummy electrode 12 is disposed between two adjacent second protrusions 211, and the at least one second dummy electrode 22 is disposed between two adjacent first electrodes 11. Because the extension lengths of the at least one first protrusion 111 and the at least one second protrusion 211 are increased, the areas of the at least one first dummy electrode 12 and the at least one second dummy electrode 22 in this embodiment are reduced compared with those in FIG. 2.

Compared with FIG. 2, the relative length between the at least one first protrusion 111 and the at least one second protrusion 211 in this embodiment is increased, so the area between the respective first electrode 11 and the respective second electrode 21 directly opposite to the respective first electrode 11 is the largest, which further increases the mutual capacitance between the respective first electrode 11 and the respective second electrode 21 but further reduces the area occupied by the respective first electrode 11 and the respective second electrode 21.

In FIGS. 2 and 4, compared with the prior art, the present application increases the proportion of the area of the corresponding electrode occupied by the dummy electrodes to reduce the proportion of the area occupied by the corresponding electrode and the side capacitance between the respective first electrode 11 and the respective second electrode 21. The relative length between the respective first electrode 11 and the respective second electrode 21 is increased, so the area between the respective first electrode 11 and the respective second electrode 21 directly opposite to the respective first electrode 11 is increased, which increases the mutual capacitance between the respective first electrode 11 and the respective second electrode 21.

In the above embodiment, because the area of the respective first electrode 11 and the respective second electrode 21 is reduced, which means that an effective touch area of the respective first electrode 11 and the respective second electrode 21 is reduced, and the area between the respective first electrode 11 and the respective second electrode 21 directly opposite to the respective first electrode 11 is increased, an actual variation does not change when a touch is grounded. The area between the respective first electrode 11 and the respective second electrode 21 directly opposite to the respective first electrode 11 is increased, which increases the mutual capacitance between the respective first electrode 11 and the respective second electrode 21, increases the capacitance variation of the product under the hovering touch, and enhances the touch sensitivity of the touch substrate.

When an increased value of the area between the respective first electrode 11 and the respective second electrode 21 directly opposite to the respective first electrode 11 is greater than the area of the effective touch area of the respective first electrode 11 and the respective second electrode 21, the touch sensitivity of the touch substrate is increased when the touch is grounded.

In the above embodiment, because an increased proposition of the relative length between the respective first electrode 11 and the respective second electrode 21 in FIG. 4 is greater than that in FIG. 2, the embodiment of FIG. 4 is better than the embodiment of the FIG. 2 under permitted conditions of processes.

Figure 6:
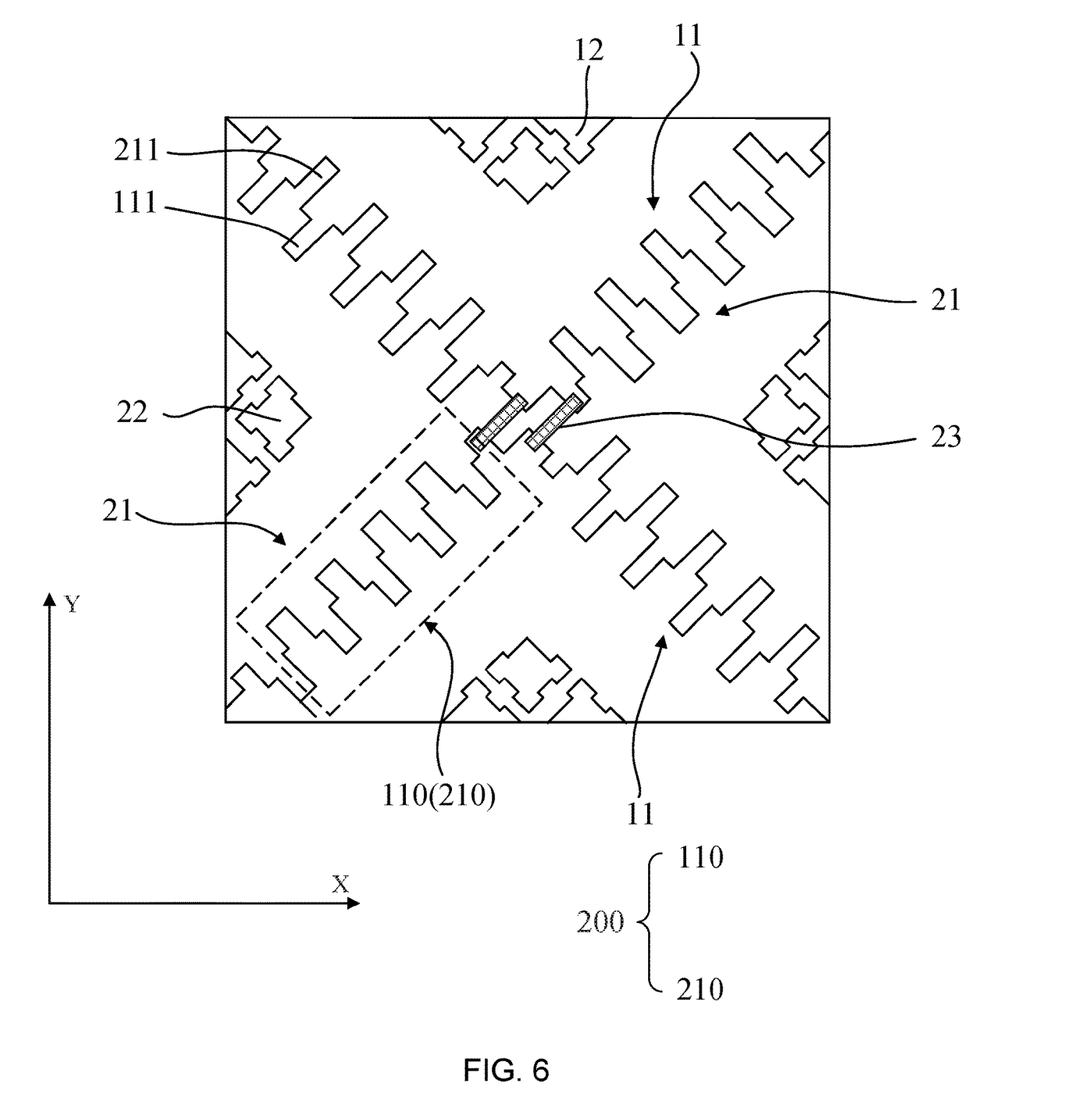
FIG. 6 is a partially enlarged diagram of a touch layer in a touch substrate in the prior art.

Please refer to FIG. 6, which is a partially enlarged diagram of a touch layer in a touch substrate in the prior art. Comparison is made below with reference to FIGS. 6 and 2. This embodiment takes areas in FIGS. 6 and 2, which are both 4.2 mm*4.2 mm, as an example for comparison. Please refer to data in TABLE 1 for details.

TABLE 1

Comparison of the data of the prior art with the improved type

| | Prior art | Improved type |
|---|---|---|
| Trace length of crossed electrodes | 43142.23 um | 45162.76 um |
| Proportion of dummy electrodes | 18.85% | 25% |
| Proportion of first electrodes | 40.72% | 37.3% |
| Proportion of second electrodes | 40.73% | 37.7% |
| Hand to driving capacitor | 0.538 pF | 0.504 pF |
| Hand to induction capacitor | 0.551 pF | 0.504 pF |
| Driving capacitor to ground | 10.95 pF | 10.268 pF |
| Inductive to ground capacitance | 11.31 pF | 10.332 pF |
| Single finger to capacitance of all electrode | 2.584 pF | 2.584 pF |
| Variation of non-hovering touch | 0.04037267 pF | 0.04034582 pF |
| Mutual capacitance | 0.521 pF | 0.823 pF |

Compared with the prior art in FIG. 6, the proportion of the area of the dummy electrodes in FIG. 2 is increased, engagement between the respective first electrode 11 and the respective second electrode 21 is increased, and the trace length at which the respective first electrode 11 and the respective second electrode 21 crossed is increased.

It can be known from TABLE 1, comparing technical solutions of the present application with the prior art, hand to driving capacitor, hand to induction capacitor, driving capacitor to ground, inductive to ground capacitance, single finger to capacitance of all electrode, and variation of non-hovering touch are slightly decrease, but the mutual capacitance between the first electrode (TX) and the second electrode (RX) is increased, which increases the touch sensitivity of the touch substrate in a grounded state.

The following is a comparison of hovering states of the prior art with the improved type. Please refer to data in TABLE 2 for details.

TABLE 2

Comparison of hovering states of the prior art with the improved type

|  | Prior art | Improved type |
|---|---|---|
| Variation of two-finger coaxial hovering touch | 0.021 | 0.031 |
| Proportion of two-finger coaxial hovering touch | 64.1% | 67.4% |
| Variation of three-finger coaxial hovering touch | 0.02 | 0.027 |
| Proportion of three-finger coaxial hovering touch | 49.7% | 56.7% |
| Variation of four-finger coaxial hovering touch | 0.015 | 0.02 |
| Proportion of four-finger coaxial hovering touch | 31.7% | 42.6% |
| Variation of five-finger coaxial hovering touch | 0.01 | 0.014 |
| Proportion of five-finger coaxial hovering touch | 19% | 38.6% |

It can be known from TABLE 2, when the present application is operated with multi fingers, the variation of the hovering touch is increased. The greater a number of fingers, the greater increased values of the variation of the hovering touch and the proportion of the hovering touch, and an increased value of the touch sensitivity is more obvious.

It can be known from TABLEs 1 and 2, the present application increases the mutual capacitance between the first electrode and the second electrode by increasing the proportion of the corresponding electrode occupied by the dummy electrodes and the relative length between the first electrode and the second electrode. This increases multi-finger coaxial capacitance variation of the product under the hovering touch and enhances the touch sensitivity of the touch substrate.

According to another aspect of the present application, a touch screen is further provided. The touch screen includes the touch substrate and further includes a polarizing layer and a cover layer sequentially disposed on the touch substrate.

According to yet another aspect of the present application, an electronic device is further provided. The electronic device includes the touch screen. The electronic device includes, but is not limited to, a mobile phone, a tablet, a computer monitor, a game console, a television, a display screen, a wearable device, and other daily appliances or household appliances with display functions.

Working principles of the touch screen and the electronic device are similar to a working principle of the touch substrate. The working principles of the touch screen and the electronic device can refer to the working principle of the touch substrate, which is not repeated herein.

The present application provides the touch substrate and the touch screen. The touch substrate includes the touch layer. The touch layer includes the at least two first electrodes and the at least two second electrodes. The respective first electrode of the at least two first electrodes includes the at least one first protrusion and the at least one first dummy electrode. The respective second electrode of the at least two second electrodes includes the at least one second protrusion and the at least one second dummy electrode. Adjacent two first protrusions or adjacent two second protrusions are spaced apart by the size of the at least one sub-pixel. The at least one first dummy electrode and the at least one second protrusion are spaced apart by the size of the at least one sub-pixel. The at least one second dummy electrode and the at least one first protrusion are spaced apart by the size of the at least one sub-pixel. The present application increases the mutual capacitance between the respective first electrode and the respective second electrode by increasing the proportion of the corresponding electrode occupied by the dummy electrodes and the relative length between the respective first electrode and the respective second electrode. This increases multi-finger coaxial capacitance variation of the product under the hovering touch and enhances the touch sensitivity of the touch substrate.

Understandably, those having ordinary skills of the art may easily contemplate various changes and modifications of the technical solution and technical ideas of the present application and all these changes and modifications are considered within the protection scope of right for the present application.

What is claimed is:

1. A touch substrate, comprising a substrate and a touch layer formed on the substrate, wherein the touch layer comprises:
    at least one first electrode group arranged along a first direction comprising at least two first electrodes arranged along a second direction and sequentially connected to each other, wherein a respective first electrode of the at least two first electrodes comprises at least one first connection region outside the respective first electrode of the at least two first electrodes, and the at least one first connection region comprises at least one first protrusion; and
    at least one second electrode group arranged along the second direction comprising at least two second electrodes arranged along the first direction and sequentially connected to each other, wherein a respective second electrode of the at least two second electrodes comprises at least one second connection region outside the respective second electrode of the at least two second electrodes, and the at least one second connection region comprises at least one second protrusion;
    wherein the at least one first protrusion is disposed between two adjacent second protrusions, the at least one second protrusion is disposed between two adjacent first protrusions, the at least one first connection region and the at least one second connection region are engaged with each other to form a connection portion of the respective first electrode and the respective second electrode;
    wherein at least one first dummy electrode disposed in the respective first electrode of the at least two first electrodes, the at least one first dummy electrode is uniformly distributed in the respective first electrode, and the at least one first dummy electrode is insulated from the respective first electrode;

wherein at least one second dummy electrode disposed in the respective second electrode of the at least two second electrodes, the at least one second dummy electrode is uniformly distributed in the respective second electrode, and the at least one second dummy electrode is insulated from the respective second electrode; and wherein adjacent two first protrusions or adjacent two second protrusions are spaced apart by a size of at least one sub-pixel, the at least one first dummy electrode and the at least one second protrusion are spaced apart by the size of the at least one sub-pixel, and the at least one second dummy electrode and the at least one first protrusion are spaced apart by the size of the at least one sub-pixel.

2. The touch substrate according to claim 1, wherein a number of the at least one first dummy electrode in the respective first electrode of the at least two first electrodes is equal to a number of the at least one second dummy electrode in the respective second electrode of the at least two second electrodes; and a shape of the at least one first dummy electrode in the respective first electrode of the at least two first electrodes is same as a shape of the at least one second dummy electrode in the respective second electrode of the at least two second electrodes.

3. The touch substrate according to claim 1, wherein a pattern of the at least one first connection region is same as a pattern of the at least one second connection region.

4. The touch substrate according to claim 3, wherein the at least one first protrusion and the at least one second protrusion are cross-shaped.

5. The touch substrate according to claim 3, wherein the at least one first protrusion in the at least one first connection region and the at least one second protrusion in the at least one second connection region have a same extension length;

the at least one first protrusion extends from the respective first electrode to the at least one second dummy electrode in the respective second electrode, and the at least one second dummy electrode and the at least one first protrusion are spaced apart by the size of the at least one sub-pixel; and the at least one second protrusion extends from the respective second electrode to the at least one first dummy electrode in the respective first electrode, and the at least one first dummy electrode and the at least one second protrusion are spaced apart by the size of the at least one sub-pixel.

6. The touch substrate according to claim 3, wherein the at least one first protrusion in the at least one first connection region and the at least one second protrusion in the at least one second connection region have different extension lengths; and an extension length of at least one the first protrusion and/or the at least one second protrusion are increased first and then decreased in the at least one first connection region and/or the at least one second connection region.

7. The touch substrate according to claim 1, wherein the respective first electrode, the at least one first dummy electrode, the respective second electrode, and the at least one second dummy electrode are composed of metal meshes; and the respective first electrode is insulated from and crossed with the respective second electrode on the touch layer through a breakpoint of the metal meshes, the at least one first dummy electrode is insulated from the respective first electrode through a breakpoint of the metal meshes, and the at least one second dummy electrode is insulated from the respective second electrode through a breakpoint of the metal meshes.

8. The touch substrate according to claim 7, wherein the metal meshes comprise a plurality of first metal traces and a plurality of second metal traces; and the plurality of first metal traces are crossed with the plurality of second metal traces to form a plurality of meshes having a same shape as an outer circle of a corresponding one of the at least one sub-pixel.

9. The touch substrate according to claim 1, wherein the at least one first electrode group further comprises at least one first metal bridge disposed between two adjacent first electrodes, and the at least one second electrode group further comprises at least one second metal bridge disposed between two adjacent second electrodes;

the at least one first metal bridge, the respective first electrode, and the respective second electrode are a same metal layer; and the at least one first metal bridge and the at least one second metal bridge are different metal layers.

10. A touch screen, comprising a touch substrate;

wherein the touch substrate comprises a substrate and a touch layer formed on the substrate, and the touch layer comprises:

at least one first electrode group arranged along a first direction comprising at least two first electrodes arranged along a second direction and sequentially connected to each other, wherein a respective first electrode of the at least two first electrodes comprises at least one first connection region outside the respective first electrode of the at least two first electrodes, and the at least one first connection region comprises at least one first protrusion; and at least one second electrode group arranged along the second direction comprising at least two second electrodes arranged along the first direction and sequentially connected to each other, wherein a respective second electrode of the at least two second electrodes comprises at least one second connection region outside the respective second electrode of the at least two second electrodes, and the at least one second connection region comprises at least one second protrusion;

wherein the at least one first protrusion is disposed between two adjacent second protrusions, the at least one second protrusion is disposed between two adjacent first protrusions, the at least one first connection region and the at least one second connection region are engaged with each other to form a connection portion of the respective first electrode and the respective second electrode;

wherein at least one first dummy electrode disposed in the respective first electrode of the at least two first electrodes, the at least one first dummy electrode is uniformly distributed in the respective first electrode, and the at least one first dummy electrode is insulated from the respective first electrode;

wherein at least one second dummy electrode disposed in the respective second electrode of the at least two second electrodes, the at least one second dummy electrode is uniformly distributed in the respective second electrode, and the at least one second dummy electrode is insulated from the respective second electrode; and wherein adjacent two first protrusions or adjacent two second protrusions are spaced apart by a size of at least one sub-pixel, the at least one first dummy electrode and the at least one second protrusion are spaced apart by the size of the at least one sub-pixel, and the at least one second dummy electrode and the at least one first protrusion are spaced apart by the size of the at least one sub-pixel.

11. The touch screen according to claim 10, wherein a number of the at least one first dummy electrode in the respective first electrode of the at least two first electrodes is equal to a number of the at least one second dummy electrode in the respective second electrode of the at least two second electrodes; and
 a shape of the at least one first dummy electrode in the respective first electrode of the at least two first electrodes is same as a shape of the at least one second dummy electrode in the respective second electrode of the at least two second electrodes.

12. The touch screen according to claim 10, wherein a pattern of the at least one first connection region is same as a pattern of the at least one second connection region.

13. The touch screen according to claim 12, wherein the at least one first protrusion and the at least one second protrusion are cross-shaped.

14. The touch screen according to claim 12, wherein the at least one first protrusion in the at least one first connection region and the at least one second protrusion in the at least one second connection region have a same extension length;
 the at least one first protrusion extends from the respective first electrode to the at least one second dummy electrode in the respective second electrode, and the at least one second dummy electrode and the at least one first protrusion are spaced apart by the size of the at least one sub-pixel; and
 the at least one second protrusion extends from the respective second electrode to the at least one first dummy electrode in the respective first electrode, and the at least one first dummy electrode and the at least one second protrusion are spaced apart by the size of the at least one sub-pixel.

15. The touch screen according to claim 12, wherein the at least one first protrusion in the at least one first connection region and the at least one second protrusion in the at least one second connection region have different extension lengths; and
 an extension length of the at least one first protrusion and/or the at least one second protrusion are increased first and then decreased in the at least one first connection region and/or the at least one second connection region.

16. The touch screen according to claim 10, wherein the respective first electrode, the at least one first dummy electrode, the respective second electrode, and the at least one second dummy electrode are composed of metal meshes; and
 the respective first electrode is insulated from and crossed with the respective second electrode on the touch layer through a breakpoint of the metal meshes, the at least one first dummy electrode is insulated from the respective first electrode through a breakpoint of the metal meshes, and the at least one second dummy electrode is insulated from the respective second electrode through a breakpoint of the metal meshes.

17. The touch screen according to claim 16, wherein the metal meshes comprise a plurality of first metal traces and a plurality of second metal traces; and
 the plurality of first metal traces are crossed with the plurality of second metal traces to form a plurality of meshes having a same shape as an outer circle of a corresponding one of the at least one sub-pixel.

18. The touch screen according to claim 10, wherein the at least one first electrode group further comprises at least one first metal bridge disposed between two adjacent first electrodes, and the at least one second electrode group further comprises at least one second metal bridge disposed between two adjacent second electrodes;
 the at least one first metal bridge, the respective first electrode, and the respective second electrode are a same metal layer; and
 the at least one first metal bridge and the at least one second metal bridge are different metal layers.

* * * * *

UNITED STATES PATENT AND TRADEMARK OFFICE
CERTIFICATE OF CORRECTION

| | |
|---|---|
| PATENT NO. | : 11,226,709 B2 |
| APPLICATION NO. | : 16/965628 |
| DATED | : January 18, 2022 |
| INVENTOR(S) | : Yichao Deng and Jian Ye |

It is certified that error appears in the above-identified patent and that said Letters Patent is hereby corrected as shown below:

On the Title Page

Item (30), Please add:
Dec. 04, 2019 (CN) 201911227794.4

Signed and Sealed this
Tenth Day of January, 2023

Katherine Kelly Vidal
*Director of the United States Patent and Trademark Office*